United States Patent [19]

Kucera

[11] Patent Number: 4,783,758

[45] Date of Patent: Nov. 8, 1988

[54] AUTOMATED WORD SUBSTITUTION USING NUMERICAL RANKINGS OF STRUCTURAL DISPARITY BETWEEN MISSPELLED WORDS & CANDIDATE SUBSTITUTION WORDS

[75] Inventor: Henry Kucera, Providence, R.I.

[73] Assignee: Houghton Mifflin Company, Boston, Mass.

[21] Appl. No.: 699,202

[22] Filed: Feb. 5, 1985

[51] Int. Cl.[4] .......................... G06F 15/21; G06F 7/28
[52] U.S. Cl. ..................................... 364/900; 364/419; 400/63; 400/83
[58] Field of Search ... 364/200 MS File, 900 MS File, 364/419; 400/61, 63, 83

[56] References Cited

U.S. PATENT DOCUMENTS

| | | | |
|---|---|---|---|
| 3,568,156 | 3/1971 | Thompson | 364/300 |
| 3,704,345 | 11/1972 | Coker | 381/44 |
| 3,760,355 | 9/1973 | Bruckert | 340/146.2 |
| 3,969,698 | 7/1976 | Bollinger | 340/146.3 WD |
| 3,995,254 | 11/1976 | Rosenbaum | 340/146.3 WD |
| 4,010,445 | 3/1977 | Hoshino | 340/146.3 WD |
| 4,041,467 | 8/1977 | Cota | 364/900 |
| 4,068,301 | 1/1978 | Ishino | 364/200 |
| 4,081,607 | 3/1978 | Vitols | 381/43 |
| 4,096,934 | 6/1978 | Kirmser | 400/110 |
| 4,136,395 | 1/1979 | Kolpek | 364/518 |
| 4,145,739 | 3/1979 | Dunning | 364/200 |
| 4,156,868 | 5/1979 | Levinson | 381/43 X |
| 4,181,813 | 1/1980 | Marley | 381/44 |
| 4,181,821 | 1/1980 | Pirz et al. | 381/43 |
| 4,270,182 | 5/1981 | Asija | 364/900 |
| 4,284,846 | 8/1981 | Marley | 381/45 |
| 4,336,421 | 6/1982 | Welch et al. | 381/43 |
| 4,342,085 | 7/1982 | Glickman | 364/300 |
| 4,355,302 | 10/1982 | Aldefeld | 340/146.3 Q |
| 4,355,370 | 10/1982 | Yanagiuchi | 364/900 |
| 4,355,371 | 10/1982 | Convis et al. | 364/900 |
| 4,373,192 | 2/1983 | Yanagiuchi | 364/419 |
| 4,383,307 | 5/1983 | Gibson, III | 364/900 |
| 4,400,828 | 8/1983 | Pirz | 382/30 |
| 4,435,617 | 3/1984 | Griggs | 382/30 |
| 4,456,969 | 6/1984 | Herzik | 364/900 |
| 4,471,459 | 9/1984 | Dickinson | 364/900 |
| 4,484,305 | 11/1984 | Ho | 364/900 |
| 4,495,566 | 1/1985 | Dickinson | 364/200 |
| 4,498,143 | 2/1985 | Strzelecki | 364/900 |
| 4,498,148 | 2/1985 | Glickman | 364/900 |
| 4,499,553 | 2/1985 | Dickinson | 364/900 |
| 4,507,750 | 5/1985 | Frantz | 364/419 |
| 4,559,598 | 12/1985 | Goldwasser et al. | 364/419 |
| 4,566,065 | 1/1986 | Toth | 364/300 |
| 4,567,606 | 1/1986 | Vensko et al. | 381/43 |
| 4,580,241 | 4/1986 | Kucera | 364/900 |
| 4,581,756 | 4/1986 | Togawa et al. | 381/43 |
| 4,672,571 | 6/1987 | Bass et al. | 364/419 |
| 4,730,269 | 3/1988 | Kucera | 364/900 |

FOREIGN PATENT DOCUMENTS

| | | | |
|---|---|---|---|
| 3032664 | 3/1981 | Fed. Rep. of Germany | 364/419 |
| 60-157662 | 8/1985 | Japan | 364/419 |
| 0241156 | 11/1985 | Japan | 364/419 |
| 1188755 | 10/1985 | U.S.S.R. | 364/419 |
| 1206810 | 1/1986 | U.S.S.R. | 364/419 |
| 2062916A | 5/1981 | United Kingdom . | |

OTHER PUBLICATIONS

J. A. De Vos, Megadoc, A Modular System for Electronic Document Handling, pp. 329–343.

"Automatic Spelling Correction in Scientific and Scholarly Text," Joseph J. Pollock and Antonio Zamora, *Communications of the ACM*, Apr. 1984, vol. 27, No. 4, pp. 358–368.

(List continued on next page.)

*Primary Examiner*—Archie E. Williams, Jr
*Attorney, Agent, or Firm*—Lahive & Cockfield

[57] ABSTRACT

A spelling correction system compares a correctly spelled word with an incorrectly spelled word to determine the degree of substitutability. If the system determines that the words are highly similar, the system flags the correct word as exclusively substitutable for the incorrect word. If the system determines the words are of moderate similarity, the correct word is flagged as a possible substitute for the incorrect word.

31 Claims, 3 Drawing Sheets

OTHER PUBLICATIONS

"Speedcop—Task C: Evaluation of Spelling Error Detection/Correction System," J. J. Pollock, Sep. 1981.

"Automatic Spelling Error Detection and Correction in Textual Databases," J. J. Pollock and A. Zamora, *International Interaction; Proceedings of the ASIS Annual Meeting*, vol. 19, Oct. 1982, pp. 236–238.

"Spelling Error Detection and Correction by Computer: Some Notes and a Bibliography," J. J. Pollock, *Journal of Documentation*, vol. 3, No. 48, Dec. 1982, pp. 282–291.

"Collection and Characterization of Spelling Errors in Scientific and Scholarly Text," J. J. Pollock and A. Zamor, *Journal of the American Society for Information Science*, Jan. 1983, pp. 51–58.

"The String-to-String Correction Problem," R. A. Wagner and M. J. Fischer, *Journal of the Association of Computing Machinery*, vol. 21, No. 1, Jan. 1974, pp. 168–173.

"The Use of Trigram Analysis for Spelling Error Detection," E. M. Zamora, J. J. Pollock and A. Zamora, *Information Processing & Management*, vol. 17, No. 6, 1981, pp. 305–316.

"Abbreviated Typing for Word Processing", S. J. P. Todd, *IBM Technical Disclosure Bulletin*, vol. 21, No. 9, Feb. 1979, pp. 3796–3797.

H. A. Gleason, Jr., An Introduction to Descriptive Linguistics, Revised Edition, Holt, Rinehart and Winston, New York, 1961, pp. 24, 34–35, and 58–61.

"Exact and Approximate Membership Testers," Carter et al., *Proceedings of the 10th Annual ACM Symposium*, May 1978, pp. 59–65.

"Give Your Computer an Ear for Names," J. Munnecke, *Byte Magazine*, vol. 5, No. 5, May 1980, pp. 196–200.

"Reducing Dictionary Size by Using a Hashing Technique," D. J. Dodds, *Communications of the Association for Computing Machinery*, vol. 25, No. 6, 1982, pp. 368–370.

"Speedcop—Final Report," J. J. Pollock, Nov. 1981.

"System Design for Detection and Correction of Spelling Errors in Scientific and Scholarly Text," J. J. Pollock and A. Zamora, *Journal of the American Society for Information Science*, Mar. 1984, pp. 104–109.

"Speedcop—Task A.1: Quantification," J. J. Pollock, Jul. 1980.

"Speedcop—Task A.3: Word Classification," K. A. Hamill, Jun. 1980.

"Speedcop—Task A.3/Task A.5: Trigram Overlap Between Automatically Derived Word Classes," Yelena M. Nayvelt, Nov. 1980.

"Speedcop—Task A.4: Word Structure Analysis," K. A. Hamill and J. J. Pollock, Jan. 1981.

"Speedcop—Task B.1: Automatic Correction of Common Misspellings," J. J. Pollock, Oct. 1981.

AUTOMATED WORD SUBSTITUTION USING NUMERICAL RANKINGS OF STRUCTURAL DISPARITY BETWEEN MISSPELLED WORDS & CANDIDATE SUBSTITUTION WORDS

BACKGROUND

This invention relates to a method and apparatus for semi-automatic spelling correction. More particularly, the invention provides a spelling correction system which compares linguistic expressions and determines whether one expression is a correct substitute for another. The invention has application in the field of text processing.

In general, text processing systems facilitate the production of printed documents. Early text processing systems primarily provided a text justification function. Subsequent systems included spelling verification procedures to flag incorrectly spelled words. More recently, these systems have incorporated spelling alternative identification procedures for displaying correctly spelled words determined algorithmically to be similar to each incorrectly spelled word.

An exemplary spelling alternative identification system is disclosed in co-pending and commonly assigned U.S. application Ser. No. 467,834 issued as U.S. Pat. No. 4,580,241 for "Method and Apparatus for Automated Spelling Correction." That system converts each incorrectly spelled word to a suspect skeletal expression and compares that expression with database skeletal expressions representing correctly spelled words. In the event the suspect skeletal expression or one of its modified forms match one or more database skeletal expressions, a set of associated correctly spelled words can be presented to the user to permit selection of a replacement expression.

A problem presented by these prior art systems is that they can provide too many candidate expressions. The task of examining these expressions and choosing between them can often be a time consuming interruption for the system user.

Further, due to errors inherent in an algorithmic candidate expression selection process, the prior art systems often mistakenly present candidate expressions which greatly differ from the suspect expression.

An object of this invention, accordingly, is to provide an improved spelling correction system for automated text processing.

More particularly, an object of the invention is to provide a spelling correction system which requires little or no user intervention in performing the correction function.

A further object of this invention is to provide an improved spelling correction system which interfaces the prior art alternative identification systems and reduces the number of suggested expressions provided by those systems.

Still further, an object of this invention is to provide a spelling verification system capable of identifying a correctly spelled expression of similarity to an incorrectly spelled expression and providing a measure of the degree of similarity.

Other objects of the invention are provided in the following description.

SUMMARY OF THE INVENTION

In one aspect, the invention relates to an improved spelling correction system comprising dual input elements, a comparison element, and a selection element. A first input element accepts a suspect expression signal representing an incorrectly spelled linguistic expression. A second input element accepts an alternate expression signal representing a correctly spelled linguistic expression. These expressions are compared by the comparison element, which generates a disparity signal representing numerically the degree of difference between the two expressions. The selection element evaluates the disparity signal to determine whether the correctly spelled expression is a potential substitute for the incorrectly spelled expression.

In another aspect, the invention provides an improved spelling correction system of the type described above and which has an element for calculating a disparity value numerically representating the type and number of occurrences of each difference between the compared expression signals. Further aspects of the invention provide elements for detecting specific disparity types presented in the compared expression signals. These disparity types include character order transposition disparity, character deletion disparity, unmatched character disparity, and expression character length disparity. Another aspect further provides an element for detecting like character-representative signals. Another aspect provides an element responsive to the detection of each disparity type for generating a signal representing the numerically-weighted structural significance of each disparity type.

Other aspects of the invention relate to the further improvement of the selection element described above. A first such improvement provides an automatic selection element which responds to a disparity signal value within a first selected range and generates a signal indicating that the alternate expression signal associated with the disparity value signal represents a word exclusively substitutable for the word represented by the suspect expression signal. This exclusive substitutability indication denotes a high degree of similarity between the pair of expressions represented by compared signals, i.e., the suspect expression and the alternate expression. A text processing system incorporating this aspect of the invention may respond to the exclusive substitutability indication by replacing the suspect expression with the alternate expression.

Another improvement provides a semi-automatic selection element which is responsive to a disparity signal value within a second range and produces a signal indicating that the alternate expression signal associated with the disparity value signal represents a word potentially substitutable for the word represented by the suspect expression signal. This potential substitutability indication denotes a moderate degree of similarity between the pair of expressions represented by the compared signals, i.e., the suspect expression and the alternate expression. A text processing system incorporating this aspect of the invention may respond to the potential substitutability indication by displaying the alternate expression and permitting the user to select that expression as a replacement for the suspect expression.

Other aspects of the invention relate to an improvement upon a method for spelling verification paralleling the apparatus aspects discussed above.

An advantage of a spelling correction system constructed in accord with the invention is that the user intervention required for correction of a single misspelled word is greatly reduced. Moreover, the amount of time required to correct an entire document containing misspellings is correspondingly decreased. Further, a spelling correction system according to the invention can automatically correct some misspelled words. Still further, a spelling correction of the type provided by the invention can interface prior art correction systems and reduce the number of candidate expressions otherwise presented to the user. Other advantages of the spelling correction system provided by the invention are evident in the description below.

BRIEF DESCRIPTION OF THE ILLUSTRATIONS

A more complete understanding of the invention may be attained by reference to the following description and the accompanying drawings, in which.

DESCRIPTION OF THE ILLUSTRATED EMBODIMENT

Figure 1:
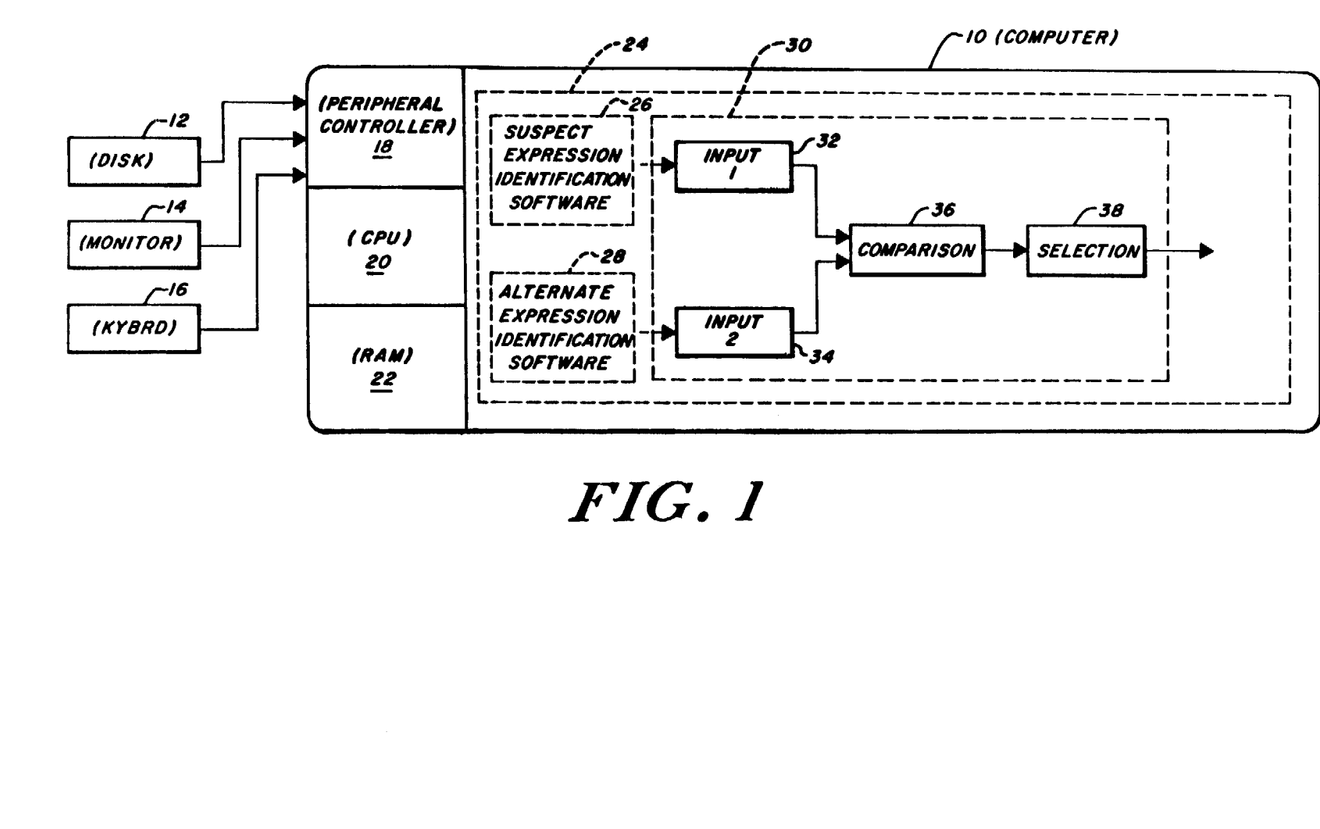
FIG. 1 is a block schematic representation of a text processing system embodying a practice of the invention.

FIG. 1 is a schematic diagram presenting hardware and software aspects of a text processing system of the type used for practice of the invention. The illustration depicts, in addition to known elements, those provided by a spelling correction system according to the invention. From the hardware perspective, a computer 10 is connected to data processing peripheral units comprising a disk drive 12, a monitor 14, and a keyboard 16. The disk drive 12 serves as a non-volatile storage element for information accessed by the computer 10. The monitor 14 and the keyboard 16 provide an interface between the computer 10 and the user. Specifically, the monitor 14 presents a graphic display of signals generated by the computer 10, while the keyboard 16 converts typed messages into computer-readable form.

The illustrated computer 10 includes functional units comprising a peripheral controller 18, a central processing unit 20, and a random access memory unit 22. The peripheral controller 18 is an interface between the computer 10 and its peripheral units. The central processing unit 20 serves as the primary source of control, arithmetic, and logic operations within the computer 10. Further, the random access memory unit 22 provides volatile, rapid-access storage for the computer 10 and, particularly, for the central processing unit 22.

The illustrated text-processing hardware used for practice of the invention can be selected from any one of many commercially available programmable digital computers and word processing systems.

FIG. 1 additionally depicts a software environment for practice of the invention. A text processing system 24 operates within the computer 10, and primarily under control of the central processing unit 20. In addition to the non-illustrated functions, e.g., text formatting and file/document management, the text processing system 24 embraces spelling verification software, including suspect expression identification software 26 and alternate expression identification software 28.

The suspect expression identification software 26 identifies incorrectly spelled words contained in documents managed by the text processing system 24. The software 26 is known in the art and typically operates through utilization of a large dictionary database and algorithms which permit rapid database access. Several suspect expression identification software packages are commercially available, and are more commonly referred to as spelling verifiers.

The alternate expression identification software 28 generates a set of one or more correctly spelled alternate expressions for possible replacement of an incorrectly spelled suspect expression. Several software packages suitable for the identification of alternate expressions are known in the art. One such package is provided in previously noted application Ser. No. 467,834 issued as U.S. Pat. No. 4,580,241 for a "Method and Apparatus for Automated Spelling Correction."

With continued reference to FIG. 1, a semi-automatic spelling corrector 30 according to the invention comprises dual input elements 32 and 34, a comparison element 36, and a selection element 38. From a functional perspective, the input element 32 accepts a suspect expression from the suspect expression identification software 26. The input element 34 accepts alternate expressions supplied by the alternate expression identification software 28. The comparison element 36 compares the suspect expression with each alternate expression, and calculates a disparity value based upon differences between the two expressions. The selection element 38 evaluates each generated disparity value and corresponding suspect-alternate expression pair to determine whether the alternate expression is of sufficient similarity to qualify as a potential substitute for the suspect expression. An output signal produced by the selection element, and indicative of the degree of substitutability of the alternate expression, is utilized by the text processor 24, as illustrated hereinbelow.

The suspect expression and alternate expression signals processed by the illustrated spelling correction system are comprised of characters. Typically, these characters are elements of the alpha-numeric character set, i.e., the set comprising letters and numbers. Other characters, e.g., punctuation symbols, may also be included within the processed expressions.

The illustrated system attains the foregoing function with operation that includes an exchange of signals representative of the logical entities, e.g., suspect expressions, alternate expressions, and disparity values, discussed herein.

Figure 2:
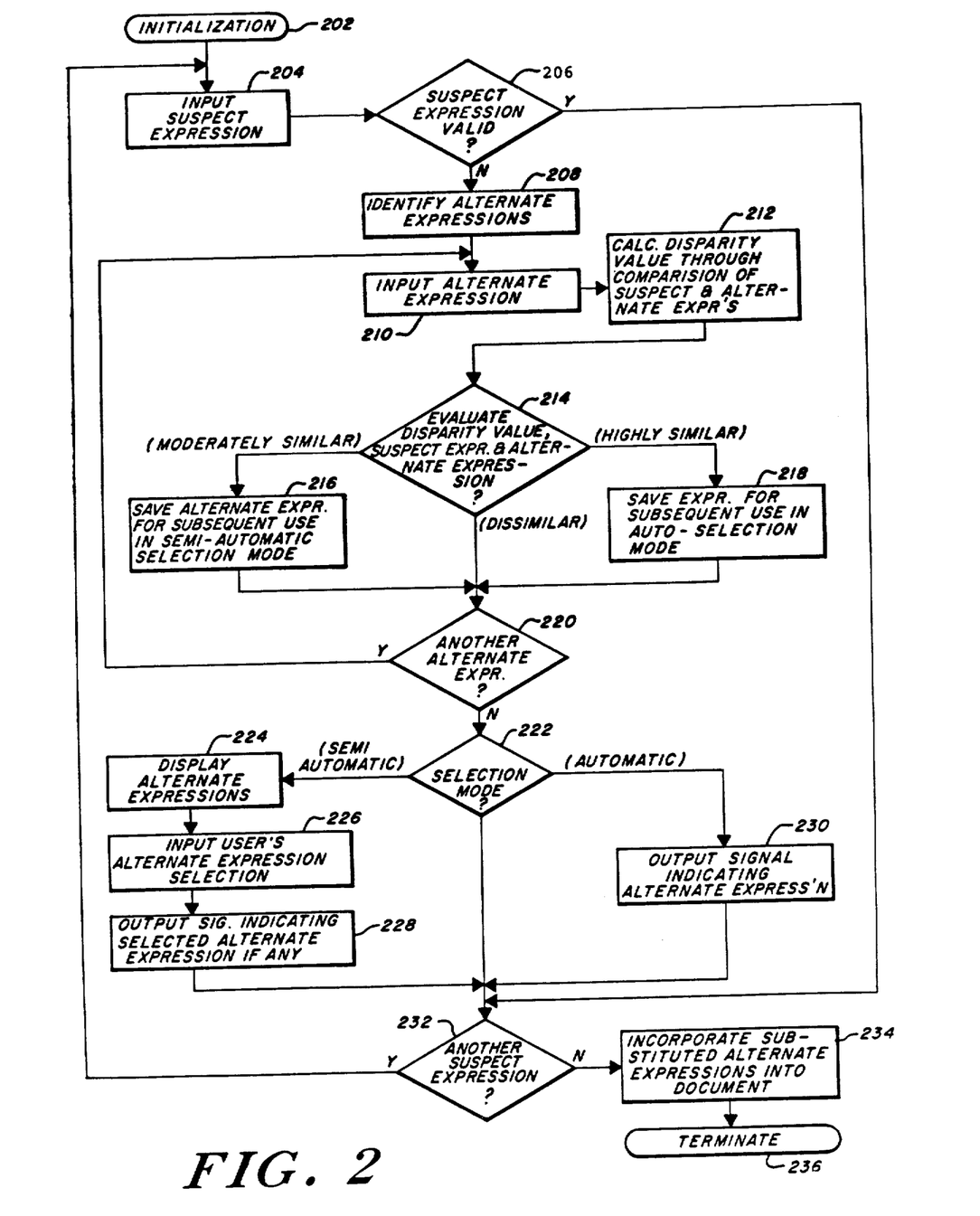
FIG. 2 is a flow chart representing an overview of the operation of a preferred semi-automatic spelling verification system according to the invention.

FIG. 2 is a flow chart presenting an overview of the semi-automatic spelling correction method according to a preferred embodiment of the invention with the system of FIG. 1. The illustrated process begins at an initialization phase 202. The extent of initialization is determined by the particular environment in which the invention is practiced. By way of example, this step may entail setting program variables, and particularly, counters and string expression pointers. Additionally, input/output processes, e.g., text file accessing routines, may require initialization prior to spelling correction. Further, the step 202 may involve initialization of database routines, such as those required for identification of alternate expressions.

Following initialization, the process accepts a suspect expression, step 204, which is to be tested for validity. As indicated in step 206, the suspect expression is checked by the suspect expression identification software. If the expression is indeed found to be invalid, e.g., misspelled, the process proceeds to step 208; otherwise, the process proceeds to step 232. In step 208, the alternate expression identification software is invoked in order to establish a set of candidate expressions. Subsequently, as indicated in step 210, the process accepts a single alternate expression from this set.

In step 212, the process compares the suspect expression with the provisionally-selected alternate expression in order to produce a disparity value, which numerically represents the structural differences between the two expressions. Subsequently, the disparity value, the suspect expression, and the alternate expression are evaluated to determine the degree of substitutability of the alternate expression for the suspect expression, step 214.

The degree of substitutability, determined in step 214, is indicated by a selection mode status, which is assigned to the suspect-alternate expression pair. A first selection mode status, automatic selection mode status, is assigned to the expression pair if there is a high degree of similarity between the suspect expression and the alternate expression. A second selection mode status, semi-automatic selection mode status, is assigned to the expression pair if there is a moderate degree of similarity between the suspect expression and the alternate expression. Further, a third selection mode status, hereinafter referred to as no-replacement selection mode status, implicitly results if neither automatic selection mode status nor semi-automatic selection mode status is assigned to the suspect-alternate expression pair. No-replacement selection mode status indicates that the suspect expression and alternate expression are relatively dissimilar.

More particularly, the selection mode status associated with a suspect expression-alternate expression pair is determined in the following manner. Automatic selection mode is established if (i) the disparity value is numerically less than a designated automatic-replacement cutoff value, and (ii) neither the suspect expression nor the alternate expression is a proper noun—as indicated by an upper case initial character, and, (iii) neither the suspect expression nor the alternate expression is less than six characters in length. The latter condition is optional; its inclusion potentially effects the selection of fewer automatic-substitution alternate expressions. Further, in one embodiment, which employs the latter condition, the character length limit is reduced to five. This reduction effects the selection of more automatic-substitution alternate expressions.

Semi-automatic selection mode is established if the disparity value is numerically less than a designated semi-automatic-replacement cutoff value and if the compared expressions do not otherwise meet the above requirements for assignment automatic selection mode status. Further, the no-replacement selection mode is implicitly established if the disparity value is numerically greater than the designated semi-automatic-replacement cutoff value.

An illustrative automatic-replacement cutoff value, determined as further described hereinbelow, is 1250, while a corresponding semi-automatic-replacement cutoff value may be 1500. A further, corresponding, semi-automatic-replacement cutoff value is 2000, which effects the selection of a larger number of candidate replacement expressions.

Following the determination of the selection mode status for an alternate expression-suspect expression pair, the illustrated process follows one of three pathways. If semi-automatic selection mode is established, the process proceeds to step 216, where the alternate expression can be stored for subsequent presentation as a substitution candidate. Further, if automatic selection mode is established, the process proceeds to step 218, where the alternate expression can be stored for automatic replacement of the suspect expression. If, on the other hand, no-replacement selection mode is implicitly established, the process proceeds directly to step 220.

In decision step 220, the process determines whether another alternate expression is available for comparison with the suspect expression. If another expression is available, the process is re-directed to step 210. Otherwise, the process proceeds to step 222.

In decision step 222, the process examines the results of all evaluations performed, previously, in step 214. If at least one alternate expression has been assigned semi-automatic selection mode status and no alternate expressions have been assigned automatic selection mode status, the process proceeds to step 224. There, the semi-automatic selection mode alternatives are presented to the user. In a preferred practice, these alternative expressions are presented in order of increasing similarity to the suspect expression. This ordering is effected by comparison of the disparity value associated with each of the alternate expressions. As indicated in step 226, the process subsequently accepts the user alternate expression selection. In step 228, the process produces a signal indicative of the alternate expression, if any, selected by the user. The text processing system handles this signal according to the requirements of the particular text processing application. Typically, the indicated alternate expression will be substituted for the suspect expression and, thus, incorporated in the processed document.

Referring again to decision step 222, if a single alternate expression has been assigned automatic selection mode status, the process proceeds to step 230. In step 230, the process produces a signal representative of this alternate expression and an indication that the alternate expression is exclusively substitutable for the suspect expression, i.e., that the alternate expression is likely the correct replacement for the suspect expression. As above, this signal is handled by the text processing system in accord with the particular text processing application, e.g., the indicated alternate expression is incorporated in the document and highlighted upon subsequent display.

With continued reference to step 222, FIG. 2, in the event multiple alternate expressions have attained automatic selection mode status, the illustrated process performs a second-level determination of the selection mode status for these multiple alternate expressions. This determination involves numerical comparision of the disparity values assigned to each of these multiple alternate expressions. In particular, if the numerical ratio of the smallest assigned disparity value to the each of the other assigned disparity values is less than a designated differential factor, the alternate expression corresponding to that smallest disparity value is deemed the sole alternate expression suitable for automatic selection mode status. In consequence, the process proceeds to step 230. If, on the other hand, the numerical ratio of the smallest assigned disparity value to any of the other disparity values is greater than the designated differential factor, all of the multiple expressions are re-assigned semi-automatic selection mode status and are processed in accord with illustrated step 224.

A suitable differential factor value is ⅓ or ⅔ and is preferably ½. In general, a large differential factor value results in decreased frequency of automatic expression replacement, particularly in instances where the suspect expression is relatively similar to numerous alternate expressions.

As further shown in step 222, if no suspect-alternate expression pair is assigned semi-automatic or automatic selection mode status, the process proceeds directly to step 232.

In decision step 232, the process determines whether another suspect expression is available. If so, the process is directed back to step 204. Otherwise, the process proceeds to termination step 236.

Figure 3:
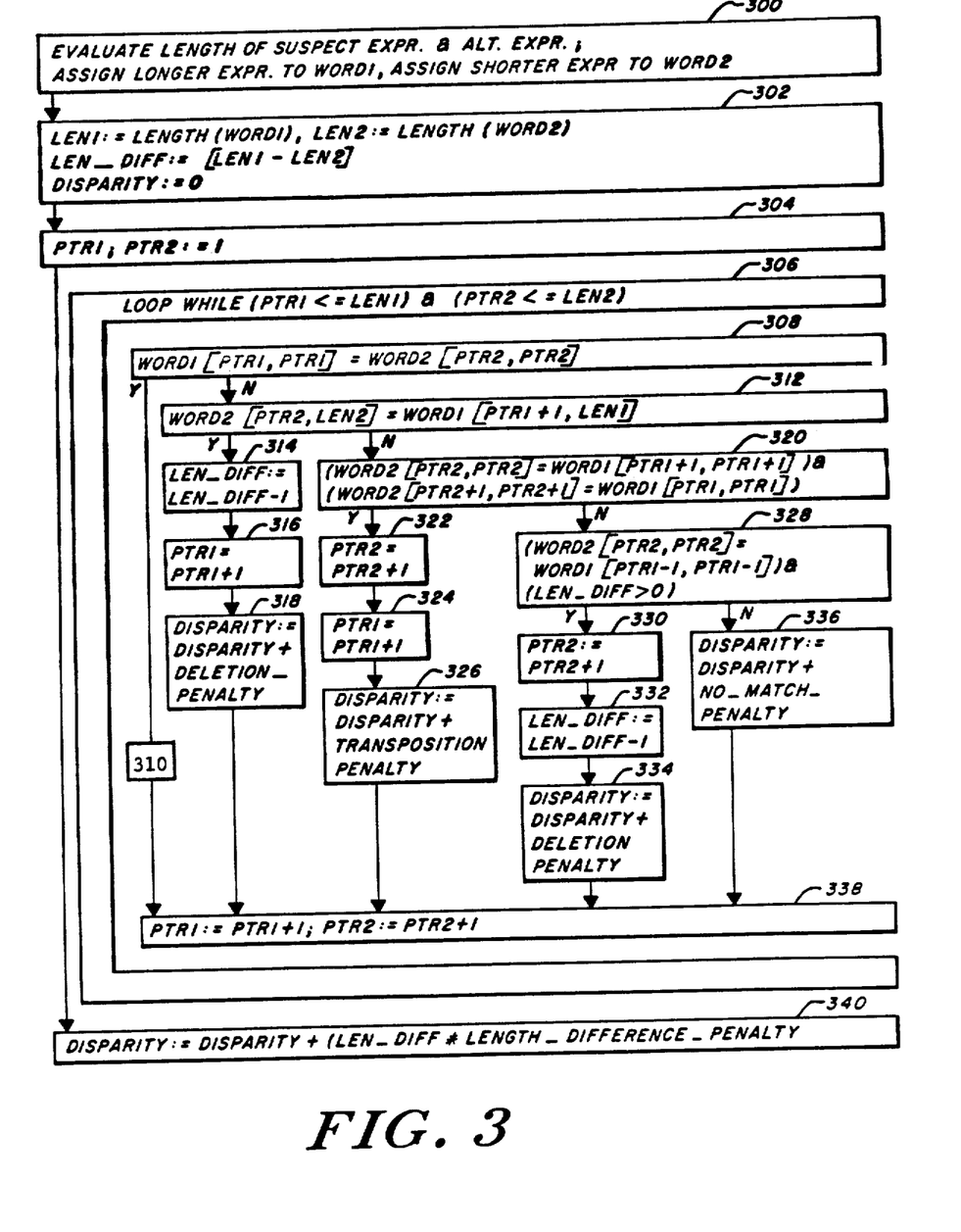
FIG. 3 is a block structure flow chart presenting a more detailed view of the operating sequence of the comparison and calculation stage of the embodiment presented in FIG. 2.

FIG. 3 presents in greater detail the process of the comparison and calculation step 212 of FIG. 2. Generally, the process illustrated by FIG. 3 computes a value which represents numerically the structural disparity between a suspect expression and an alternate expression.

More particularly, through character-by-character comparison, the illustrated process identifies character deletion disparity, unmatched character disparity, character transposition disparity, and expression character-length disparity. Character deletion disparity results where a character, contained in one expression, is absent from the other expression. Character transposition disparity results where a character pair in one expression is transposed with respect to a corresponding character pair in the other expression. Unmatched character disparity results where a character in one expression does not match an associated character in the other expression and where that mismatch is not the result of a character deletion or a character transposition. Further, expression character length disparity results where the compared expressions are of differing character lengths and where these differing lengths are not otherwise attributable to character deletion disparity or unmatched character disparity.

Upon identification of any of the above disparity types, the process increments a disparity accumulator by a penalty value associated with the detected type. In this way, the disparity accumulator stores a value numerically representative of the structural differences between the compared expressions.

The character-by-character comparison process, including the detection of specific disparity types and accumulation of disparity penalties, is further explained by the block flow chart of FIG. 3, beginning at step 300.

In step 300, the process evaluates the length of the suspect expression and of the alternate expression. The expression of greater length is assigned to the variable WORD1, while the expression of lesser length is assigned to the variable WORD2.

Step 302 illustrates the initialization of several program variables. Initially, the variable LEN1 is set equal to the character length of the expression stored in the variable WORD1. The variable LEN2 is set equal to the character length of the expression stored in the variable WORD2. The variable representing the difference between the character lengths of the two stored expressions, LEN-DIFF, is set equal to the absolute value of the difference between the variables LEN1 and LEN2. Further, the variable DISPARITY, referred to above as the disparity accumulator, is set equal to zero.

In step 304, the two current character pointer variables, PTR1 and PTR2, relating to the character currently subject to processing in each of the variables, WORD1 and WORD2, respectively, are set equal to one.

Step 306 delineates the boundaries of a program loop which evaluates the expressions stored in variables WORD1 and WORD2 and determines, on a character by character basis, the differences between the expressions. The steps of the loop are executed sequentially, while the loop itself is executed repeatedly, until the loop termination conditions are met. These termination conditions are satisfied if the value of variable PTR1 is greater than the value of variable LEN1 or when the value of the variable PTR2 is greater than the value of variable LEN2.

Decision step 308 marks the beginning of the loop sequence. In that step, the current characters of the expressions stored in the variables WORD1 and WORD2 are compared. As indicated by the YES branch of step 308, if the current characters are equivalent, no specific action is taken and the process proceeds to step 338. If, on the other hand, the current characters of the stored expressions are not equivalent, the process proceeds through the NO branch of step 308 to step 312.

In decision step 312, the process compares the WORD2 sub-expression beginning at the current character with the WORD1 sub-expression beginning at the character following the current character. If these two subexpressions are equivalent, the process proceeds through the YES branch of step 312 to step 314. Otherwise, the process proceeds through the NO branch of step 312 to step 320.

In step 314, the length difference variable LEN-DIFF is decremented by one. In step 316, the current character pointer for variable WORD1, variable PTR1 is incremented by one. In step 318, the variable DISPARITY is incremented by a penalty value corresponding with character deletion. Following step 318, the process proceeds to step 338.

In decision step 320, the illustrated system tests for a transposition error by performing two evaluations. The first evaluation involves comparing the current character of the expression stored in WORD2 with the character following the current character of the expression stored in variable WORD1. Conversely, the second evaluation involves comparing the character following the current character of the expression stored in variable WORD2 with the current character of the expression stored in variable WORD1. If both evaluations of step 320 are determined in the affirmative, the process proceeds through the YES branch of step 320 to step 322. Otherwise, the process proceeds to step 328.

In steps 322 and 324, the process increments by one the character pointers PTR1 and PTR2. In step 326, the process increments the variable DISPARITY by a character transposition penalty value. Subsequently, the process proceeds to step 338.

In decision step 328, the process performs two evaluations in testing for character deletion disparity. The first evaluation involves comparing the current character of the expression stored in WORD2 with the character preceding the current character of the expression stored in the variable WORD1. The second evaluation requires testing the length difference variable, LEN-DIFF, to determine if it is greater than zero. If both evaluations of step 328 are determined in the affirmative, the process proceeds through the YES branch of that step to step 330. Otherwise, the process proceeds to step 336.

In step 330, the pointer PTR2 is incremented by one. In subsequent step 332, the length difference variable, LEN-DIFF is decremented by one. Subsequently, in step 334, the value of the variable DISPARITY is incremented by the deletion disparity penalty value.

In step 336, the value of the variable DISPARITY is altered to indicate an unmatched character, i.e., incremented by the no-match disparity penalty value.

In step 338, the current character pointers associated with variables WORD1 and WORD2, i.e., variables PTR1 and PTR2, are incremented by one. As explained above, and indicated by the diagram, subsequent to execution of step 338, the process is redirected to step 306, where the loop termination conditions are re-evaluated.

Subsequent to completion of the character by character comparison of the expressions stored in variables WORD1 and WORD2, the process proceeds to step 340. There, the value of the variable DISPARITY is incremented by a multiplicative product of the variable LEN-DIFF and the per-character length difference penalty value. The value of the variable DISPARITY, resulting from the computation of step 340, corresponds with the disparity value discussed in conjunction with step 212 of FIG. 2.

In an illustrated preferred English language embodiment, the specific disparity type values are as follows. A deletion error penalty is assigned a value of 450. The penalty value associated with a transposition error is 650. A no-match error is valued at 800. Further, the per character length-difference penalty value is 400. The cut-off values of 1250, 1500 and 2000 stated above are preferred for these disparity values.

While the specific disparity type penalty values listed above correspond to the selection mode status ranges discussed above in conjunction with FIG. 2, it will be understood that other values may be used. Particularly, any of these values can be increased or decreased depending upon the particular requirements of the user installation. For example, the values can be adjusted depending upon the language in which the processed document is written. Further, it will be understood that the invention encompasses a spelling correction system which can detect and assign penalty values to other disparity types. Still further, it will be understood that the invention may be practiced with a reduced set of detected disparity types; not all those illustrated in FIG. 3 need to be used.

The foregoing spelling correction system acts in conjunction with known text processing systems to reduce or eliminate user intervention in the correction process. More particularly, a spelling correction system of the type provided by the invention compares an incorrectly spelled word, i.e., a suspect expression, with a correctly spelled word, i.e., an alternate expression, and determines the degree of similarity between them. Dependent upon this degree of similarity, the spelling correction system assigns a selection mode status to each suspect expressionalternate expression pair. This selection mode status determines the manner in which the text processing system may handle the alternate expression vis-a-vis the suspect expression. Particularly, the assignment of automatic selection mode status indicates that the alternate expression is likely to be a correctly spelled form of the suspect expression, while the assignment of semi-automatic selection mode status indicates that the alternate expression is a replacement candidate for the suspect expression.

Those skilled in the art may make changes in the described embodiment, and in the other teachings herein, for further practice which is within the scope of the invention described and claimed herein.

What is claimed is:

1. In apparatus for automated linguistic expression substitution, the improvement comprising
   A. first input means for inputting, into said apparatus, a suspect expression signal representative of a linguistic expression consisting of characters,
   B. second input means for inputting, into said apparatus, an alternate expression signal representative of a permissible linguistic expression consisting of characters,
   C. comparison means, connected to said first and second input means, for comparing said suspect expression signal with said alternate expression signal and for producing a disparity signal numerically representative of differences between a spelling of the linguistic expression represented by said suspect expression signal and a spelling of the linguistic expression represented by said alternate expression signal, said comparison means including means for detecting disparity types representative of
      (i) transposition of character order,
      (ii) deletion of a character,
      (iii) an unmatched character, and
      (iv) differences in expression character length, occurring between said compared expression signals, said comparison means further including means responsive to the detection of said disparity type for producing a signal indicative of the numerically-weighted structural significance of that type, and
   D. selection means, connected to said comparison means and responsive to a numerical value represented by said disparity signal, for selectively determining said alternate expression to be substitutable for said suspect expression and for producing an output signal indicative thereof.

2. In apparatus according to claim 1, the further improvement whereby said comparison means includes means for producing said disparity signal to be numerically representative of the type and magnitude of differences between said suspect expression signal and said alternate expression signal.

3. In apparatus according to claim 1, the further improvement whereby said comparison means includes means for detecting a disparity type representative of transposition of character order, with respect to said alternate expression signal, within said suspect expression signal.

4. In apparatus according to claim 1, the further improvement whereby said comparison means includes means for detecting a disparity type representative of the deletion of a character, with respect to said alternate expression signal, from said suspect expression signal.

5. In apparatus according to claim 1, the further improvement whereby said comparison means includes means for detecting a disparity type representative of an unmatched character, with respect to said alternate expression signal, within said suspect expression signal.

6. In apparatus according to claim 1, the further improvement whereby said comparison means includes means for detecting a disparity type resulting from differences in the number of characters represented by said suspect expression signal and by said alternate expression signal.

7. In apparatus according to claim 1, the further improvement whereby said comparison means includes means for detecting like characters represented in said suspect expression signal and said alternate expression signal.

8. In apparatus according to claim 1, the further improvement whereby said comparison means further includes means for computing a disparity value as a summation of values indicated by each said significance signal.

9. Apparatus for automated linguistic expression substitution having a keyboard for accepting expressions and converting them into signals representative thereof, a monitor for graphic display of signals representative of symbols and linguistic expressions, a processing unit for processing signals representative of lingiuistic expressions, and a storage unit for storing signals representative of linguistic expressions, and further having the improvement comprising    A. first input means for inputting from at least one of said keyboard, said processing unit, and said storge unit, a suspect expression signal representative of a linguistic expression,    B. second input means for inputting, from at least one of said processing unit or said storage unit, alternate expression signals representative of one or more permissible linguistic expressions,    C. comparison means, connected to said first and second input means, for comparing said suspect expression signal with each said alternate expression signal and for producing a disparity signal numerically representative of differences between a spelling of the linguistic expression represented by said suspect expression signal and a spelling of the linguistic expression represented by each said alternate expression signal, said comparison means including means for detecting disparity types representative of      (i) transposition of character order,
     (ii) deletion of a character,
     (iii) an unmatched character, and
     (iv) differences in expression character length, occurring between said compared expression signals, and further includes means responsive to the detection of said disparity type for producing a signal indicative of the numerically-weighted structural significance of that type, and    D. selection means, connected to said comparison means and responsive to a numerical value represented by said disparity signals, for selecting the alternate expression signal, if any, to replace said suspect expression and for producing an output signal indicative thereof.

10. Apparatus according to claim 9, having the further improvement whereby said comparison means includes means for producing said disparity signal to be numerically representative of the type and magnitude of differences between said suspect expression signal and said alternate expression signal.

11. Apparatus according to claim 9, having the further improvement whereby the comparison means includes means for detecting a disparity type representative of transposition of character order, with respect to said alternate expression signal, within said suspect expression signal.

12. Apparatus according to claim 9, having the further improvement whereby the comparison means includes means for detecting a disparity type representative of deletion of characters, with respect to said alternate expression signal, from said suspect expression signal.

13. Apparatus according to claim 9, having the further improvement whereby the comparison means includes means for detecting a disparity type representative of unmatched characters, with respect to said alternate expression signal, within said suspect expression signal.

14. Apparatus according to claim 9, having the further improvement whereby the comparison means includes means for detecting a disparity type resulting from differences in the number of characters represented by said suspect expression signal and by said alternate expression signal.

15. Apparatus according to claim 9, having the further improvement whereby the comparison means includes means for detecting like characters represented in said suspect expression signal and said alternate expression signal.

16. Apparatus according to claim 10, having the further improvement whereby said comparison means further includes means for computing a disparity value as the summation of values indicated by each said significance signal.

17. Apparatus according to claim 9, having the improvement whereby said selection means includes auto-selection means coupled to said comparison means and responsive to a disparity signal representative of a value in a first numerical range for determining the alternate expression signal corresponding to a disparity signal to be exclusively substitutable for the suspect expression signal corresponding to said disparity signal and for producing a signal indicative thereof.

18. Apparatus according to claim 17, having the improvement whereby said auto-selection means includes means responsive to the number of characters represented by each of said suspect expression signal and said alternate expression signal being greater than a selected value, and for producing a signal indicative thereof.

19. Apparatus according to claim 17, having the further improvement whereby said selection means includes semi-automatic selection means coupled to said comparison means and responsive to a disparity signal representative of values in a second selected numerical range for selectively graphically displaying on said monitor one or more of said alternate expressions signals, said second selected numerical range having a lower value bound larger than a lower value bound of said first selected numerical range.

20. Apparatus according to claim 19, having the further improvement whereby said semi-automatic selection means includes means for accepting from said keyboard a signal indicative of an alternate expression signal, if any, to replace a corresponding suspect expression signal.

21. Apparatus according to claim 19, having the further improvement whereby said semi-automatic selection means includes means responsive to said disparity signal for ordering a display of alternate expression-representative signals on said monitor.

22. In a method for automated linguistic expression substitution on a digital data processor, the improvement wherein said digital data processor executes steps comprising
  A. accepting into said digital data processor a suspect expression signal representative of a linguistic expression consisting of characters,
  B. accepting into said digital data processor an alternate expression signal representative of a permissible linguistic expression consisting of characters,
  C. comparing within said digital data processor said suspect expression signal with said alternate expression signal and producing a disparity signal numerically representative of differences between a spelling of the linguistic expression represented by said suspect expression signals and a spelling of the linguistic expression represented by said alternate expression signal, said comparing step including the step of producing said disparity signal to be numerically representative of the type and magnitude of differences between said suspect expression signal and said alternate expression signal, said comparing step further including the steps of responding to the detection of transposition, character deletion, unmatched character, and character length disparity types for producing a signal indicative of the numerically-weighted structural significance of that detected type, and
  D. evaluating within said digital data processor a numerical value represented by said disparity signal for determining whether said alternate expression signal is substitutable for said suspect expression signal and for producing an output signal indicative thereof.

23. In a method for automated linguistic expression substitution on a digital data processor according to claim 22, the improvement in which said comparing step further comprises the step of detecting a disparity type representative of transposition of character order, with respect to said alternate expression signal, within said suspect expression signal.

24. In a method for automated linguistic expression substitution on a digital data processor according to claim 22, the improvement in which said comparing step further comprises the step of detecting a disparity type representative of deletion of characters, with respect to said alternate expression signal, from said suspect expression signal.

25. In a method for automated linguistic expression substitution on a digital data processor according to claim 22, the improvement in which said comparing step further comprises the step of detecting a disparity type representative of unmatched characters, with respect to said alternate expression signal, within said suspect expression signal.

26. In a method for automated linguistic expression substitution on a digital data processor according to claim 22, the improvement in which said comparing step further comprises the step of detecting a disparity type resulting from differences in the number of characters represented by said suspect expression signal and by said alternate expression signal.

27. In a method for automated linguistic expression substitution on a digital data processor according to claim 22, the improvement in which said comparing step further comprises the step of detecting like characters represented in said suspect expression signal and said alternate expression signal.

28. In a method for automated linguistic expression substitution on a digital data processor according to claim 22, the improvement in which said comparing step further comprises the step of computing a disparity value as the summation of values indicated by each said significance signal.

29. In a method for automated linguistic expression substitution on a digital data processor according to claim 22, the improvement in which the evaluating step further comprises the steps of responding to a disparity signal in a selected first range of disparity signal values for determining the alternate expression signal corresponding to a disparity signal to be exclusively substitutable for the suspect expression signal corresponding to said disparity signal and for producing a signal indicative thereof.

30. In a method for automated linguistic expression substitution on a digital data processor according to claim 29, the improvement in which the evaluating step further comprises the steps of responding to the number of characters represented by each of said suspect expression signal and said alternate expression signal being greater than a selected value and for producing a signal indicative thereof.

31. In a method for automated linguistic expression substitution on a digital data processor according to claim 29, the improvement in which the evaluating step further comprises the step of responding to a disparity signal value in a selected second range of disparity signal values and producing an output signal indicative thereof, said second disparity signal value range having a lower value bound larger than a lower value bound of said first disparity signal value range.

* * * * *